J. F. GORMAN.
CLUTCH.
APPLICATION FILED SEPT. 16, 1918.

1,341,796.

Patented June 1, 1920.
2 SHEETS—SHEET 2.

INVENTOR,
John F. Gorman,
By Mack & Leizenberg
Attorneys,

J. F. GORMAN.
CLUTCH.
APPLICATION FILED SEPT. 16, 1918.
1,341,796.
Patented June 1, 1920.
2 SHEETS—SHEET 1.
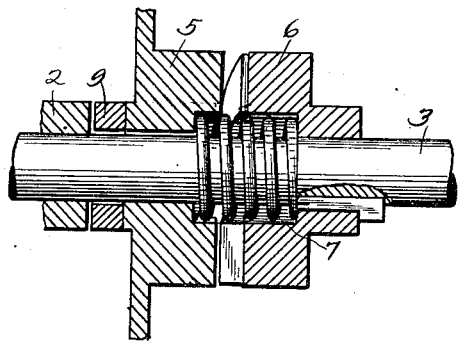
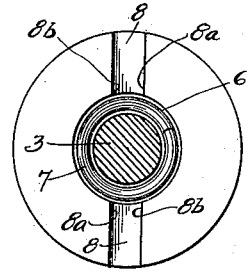
Fig.4  Fig.2  Fig.3
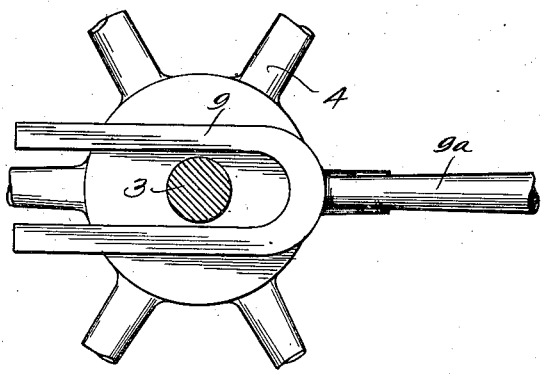
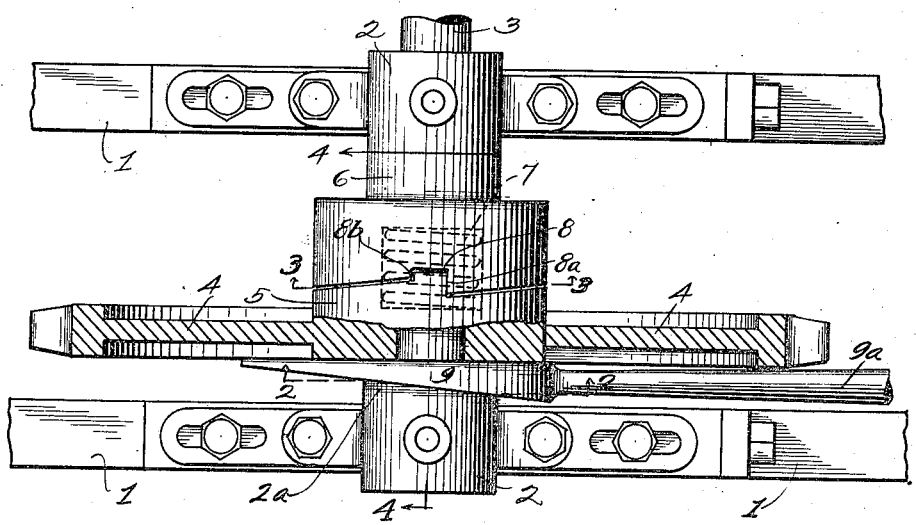
Fig.1
INVENTOR,
John F. Gorman,
By Mack & Litzenberg
Attorneys

UNITED STATES PATENT OFFICE.

JOHN F. GORMAN, OF PORTLAND, OREGON.

CLUTCH.

1,341,796.

Specification of Letters Patent.

Patented June 1, 1920.

Application filed September 16, 1918. Serial No. 255,201.

*To all whom it may concern:*

Be it known that I, JOHN F. GORMAN, a citizen of the United States, residing in the city of Portland, county of Multnomah, and State of Oregon, have invented certain new and useful Improvements in Clutches, of which the following is a specification.

My invention relates to clutches, and more particularly to certain improvements in spiral clutches whereby to render said spiral clutches operable backward for emergency purposes.

My invention is particularly adaptable to power saws which are frequently operated by a simple two cycle engine. It is not infrequent that these engines back fire which would cause the two parts of a spiral clutch to expand as one part thereof is thus turned on the other part. In portable power saws the frame structure is usually of close construction with the spiral clutch between the side members, and this expansion action of the clutch members, in case of back fire in the engine, spreads the side members of the frame structure. The principal object of my invention is to provide a spiral clutch of such construction that in case of back fire, the parts of the clutch will not be moved relative to each other and spread the frame structure, but the connected mechanism will also be turned backwardly together. And while the engagement of my clutch jaws or parts might not be sufficient for continuous back driving, it is sufficient for emergency purposes, and could be made strong enough for continuous back driving, in cases where that is an advantage. Broadly stated, my clutch has interlocking or engaging jaws or portions which interlock when the clutch members are moved toward each other while one part is turning in one direction, and after this engagement, the clutch parts are moved close together and a further interlocking takes place which makes it possible to drive in either direction through said clutch. In connection with such a clutch, I prefer to use a slip clutch or other yielding clutch connection so that when my improved clutch is moved into driving connection, the sudden transmission of power to quiet parts will not jar or break any of the parts, as would be the case if parts turning rapidly, under power, were thrown suddenly into engagement with other parts standing still.

In order to fully illustrate my improved mechanism, I have shown one practical embodiment thereof on the accompanying sheets of drawings, in which—

Figure 1 is a top plan view of mechanism showing my improved clutch as a part thereof;

Fig. 2 is a side view of a clutch operating wedge fork;

Fig. 3 is a sectional view taken on line 3—3 of Fig. 1;

Fig. 4 is a longitudinal sectional view through the clutch;

Figure 5:
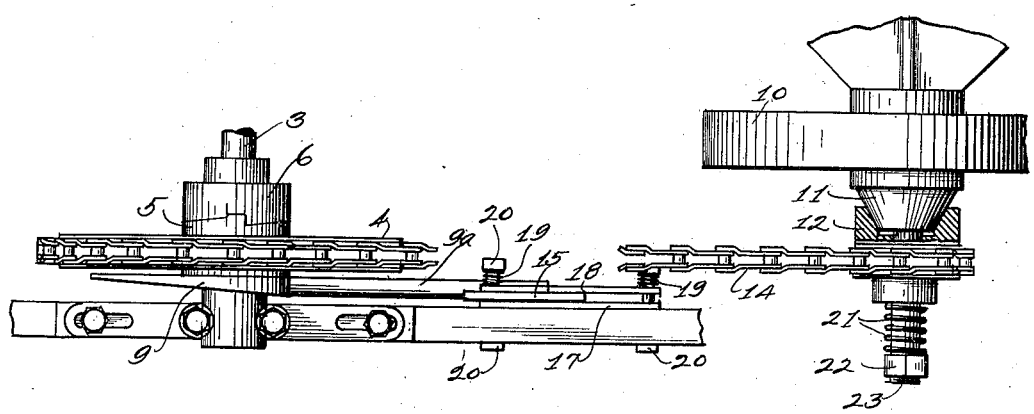
Fig. 5 is a plan view showing a driving element, including a friction clutch, in combination with a driven element, including my improved interlocking clutch.

Referring more in detail to the drawings, 1, 1, designate two side members or supports, on which are mounted two bearing boxes, 2, 2, through which is a shaft 3. As here shown, a sprocket wheel 4 is mounted on the shaft 3, said sprocket wheel having formed as a part of its hub, one clutch member 5, adapted to coöperate with and be locked with a second clutch element 6. Said clutch elements 5 and 6 are of enlarged form at their engaging ends, and are provided therein, around the shaft 3, with a spiral expansion spring 7, indicated in dotted lines in Fig. 1, which spring normally acts to spread said clutch members apart.

Instead of providing the usual straight shoulder interlock between the clutch portions, I provide a square notch 8, one side of which 8$^a$, is deeper than the other side thereof, 8$^b$. The extent of the engagement between the two parts of the clutch members at 8$^a$, is considerable and for regular driving purposes, while the extent of the engagement between the two parts of the clutch at 8$^b$, is comparatively short and only sufficient to answer for emergency purposes. That is, in case of back fire of the engine, the interlock for turning backward is sufficient to turn both parts of the clutch instead of allowing only one part to turn and to be moved away from the other part in such a way as to spread the supporting members 1, 1, assuming, of course, that the operating wedge fork 9 is in its clutch-closing position, as shown in Fig. 1. The side of the wedge fork 9 next to the sprocket wheel is preferably straight, while its opposite side is tapered and slides on the correspondingly tapered side of the box, as at 2ª. Said wedge fork is operated by means of a rod portion 9ª, extended to any suitable position and connected with any kind of operating means.

In my clutch as here shown, I have provided two interlocking places, at opposite sides, thus giving an opportunity for a half turn of the clutch parts relative to each other before the drive connections take place, and this driving connection, that is, the engagement between the long shoulders at 8ª takes place before the parts are moved wholly into their interlocked positions, making it easy to move the clutch members together sufficiently for their engagement and then as they are both moving to move them fully into interlocking condition, as shown in Fig. 1. In other words, there is a spiral clutch engagement with the initial movement of the movable clutch member and following this initial engagement, the clutch members are then easily and directly moved into fully interlocked engagement with each other, just as would be a close fitting, square clutch. With this construction the parts are automatically put into register with each other before being moved together, which is not the case with the square clutch.

Figure 6:
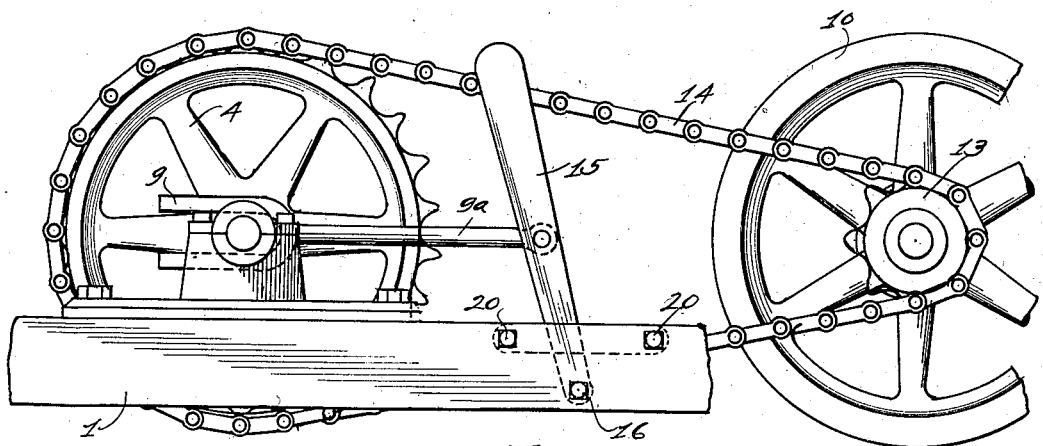
Fig. 6 is a side view of the mechanism shown in Fig. 5.

Referring now to Figs. 5 and 6, I have shown a connection between a driving member and a driven member in which my improved clutch is included, and also a yielding or friction clutch.

In these figures 10 designates the fly wheel of a motor, which fly wheel is provided with a cone friction clutch, the elements of which are designated 11 and 12. The element 12 is connected to a small sprocket 13, over which runs a driving chain 14, to the large sprocket 4, with which is connected the clutch element 5 of my improved clutch, as here illustrated. The sprocket 4 with its clutch element 5 is moved axially by means of the wedge fork 9, the operating rod 9ª of which is connected to a hand lever 15, pivotally connected at its lower end to the frame member 1, as at 16. Said hand lever 15 moves between two plates, 17 and 18 normally moved together by means of coiled springs, 19, 19, on the bolts 20, 20, as shown. Said hand lever 15 is thus frictionally held in its adjusted positions.

The friction clutch elements 11 and 12 are normally held in engagement with each other by means of a coiled spring 21, which bears against a nut 22, on the outer end of the shaft 23, from the motor, as will be clearly understood. The friction clutch in itself is old, but a friction or yielding clutch in combination with a special spiral clutch of the character I show and describe I believe is new. They coöperate together to make a very effective drive and to avoid the objection pointed out in case of back fire of the engine.

I have found from my experience that when a spiral clutch of the ordinary type is used in a portable power saw of the character referred to, that the objection pointed out is present, and in view of this, I have worked out and designed my improved spiral clutch which makes provision for turning the mechanism backwardly in case of any back fire.

I am aware that slight changes can be made in my clutch as here illustrated without departing from the real spirit thereof, and that it can be adapted for other uses, and I do not, therefore, limit the invention to the specific embodiment shown, except as I may be limited by the hereto appended claims.

I claim:

In combination with a shaft, a clutch element keyed thereto and having an annular space therein around said shaft, a second clutch element, slidable on said shaft, having an annular space therein around said shaft, an expansion spring around said shaft between said clutch elements and having its opposite ends extending into the annular spaces in said clutch elements for moving them apart, said clutch elements having on their adjacent faces correspondingly long engaging shoulders adapted to engage each other when one of said clutch elements is turned in one direction relative to the other, and having short engaging shoulders adapted to engage with each other when said clutch elements are moved wholly together axially of said shaft, and a wedge member adapted to be moved transversely of the axis of said shaft, in engagement with said slidable clutch element, whereby to force said slidable clutch element into interlocked engagement with the other clutch element, against the tension of said expansion spring therebetween, substantially as described.

Signed at Los Angeles, Los Angeles county, California, this 26th day of August, 1918.

JOHN F. GORMAN.

In presence of—
WILLIAM R. LITZENBERG,
H. M. BRUNDAGE.